US012657437B2

(12) United States Patent (10) Patent No.: US 12,657,437 B2
Gilbert (45) Date of Patent: Jun. 16, 2026

(54) SPATIAL FREQUENCY SPLITTING FOR CONVOLUTIONAL NEURAL NETWORKS

(71) Applicant: INTERNATIONAL BUSINESS MACHINES CORPORATION, Armonk, NY (US)

(72) Inventor: Sebastien Gilbert, Granby (CA)

(73) Assignee: Internaional Business Machines Corporation, Armonk, NY (US)

( * ) Notice: Subject to any disclaimer, the term of this patent is extended or adjusted under 35 U.S.C. 154(b) by 561 days.

(21) Appl. No.: 18/337,177

(22) Filed: Jun. 19, 2023

(65) Prior Publication Data

US 2024/0419948 A1 Dec. 19, 2024

(51) Int. Cl.
    *G06N 3/04* (2023.01)
    *G06N 3/0464* (2023.01)
(52) U.S. Cl.
    CPC ................................. *G06N 3/0464* (2023.01)
(58) Field of Classification Search
    CPC .................................................. G06N 3/0464
    See application file for complete search history.

(56) References Cited

U.S. PATENT DOCUMENTS

| | | | |
|---|---|---|---|
| 9,734,824 B2 | 8/2017 | Penn | |
| 11,762,990 B2 * | 9/2023 | Gururajan | ........... H04L 63/1483 |
| | | | 726/23 |

| | | | |
|---|---|---|---|
| 2018/0349759 A1 | 12/2018 | Isogawa | |
| 2019/0258917 A1 | 8/2019 | Chai | |
| 2019/0373589 A1 * | 12/2019 | Hwang | ................... H04L 5/003 |
| 2022/0004810 A1 | 1/2022 | Sinha | |
| 2022/0114424 A1 | 4/2022 | Quader | |
| 2022/0223144 A1 | 7/2022 | Sun | |
| 2023/0230369 A1 * | 7/2023 | Kamon | ................. G06V 10/82 |
| | | | 382/156 |

OTHER PUBLICATIONS

Geirhos et al., "ImageNet-Trained CNN's Are Biased Towards Texture; Increasing Shape Bias Improves Accuracy and Robustness," arXiv:1811.12231v2 [cs.CV] Jan. 14, 2019, 22 pages.
Malekhosseini et al., "Splitting Convolutional Neural Network Structures for Efficient Inference," arXiv 2002.03302 [cs.CV], Feb. 9, 2020, 5 pages.
Yedla et al., "On the Performance of Convolutional Neural Networks Under High and Low Frequency Information," Springer Nature Singapore Pte Ltd., 2021, pp. 214-224.
Szegedy et al., "Intriguing properties of neural networks," arXiv:1312. 6199v4 [cs.CV], Feb. 19, 2014, 10 pages.

* cited by examiner

*Primary Examiner* — Scott C Anderson
(74) *Attorney, Agent, or Firm* — Seed Intellectual Property Law Group LLP

(57) ABSTRACT

A system may allocate, in response to receiving an input tensor of a predetermined shape, a portion of convolution kernels to a predetermined number of spatial frequency bands; replace the convolution layer in a convolutional neural network with a sequence of band splitting, parallel convolutions, and concatenation; and form, in response to completing stages for the predetermined number of spatial frequency bands, a final output tensor.

20 Claims, 13 Drawing Sheets

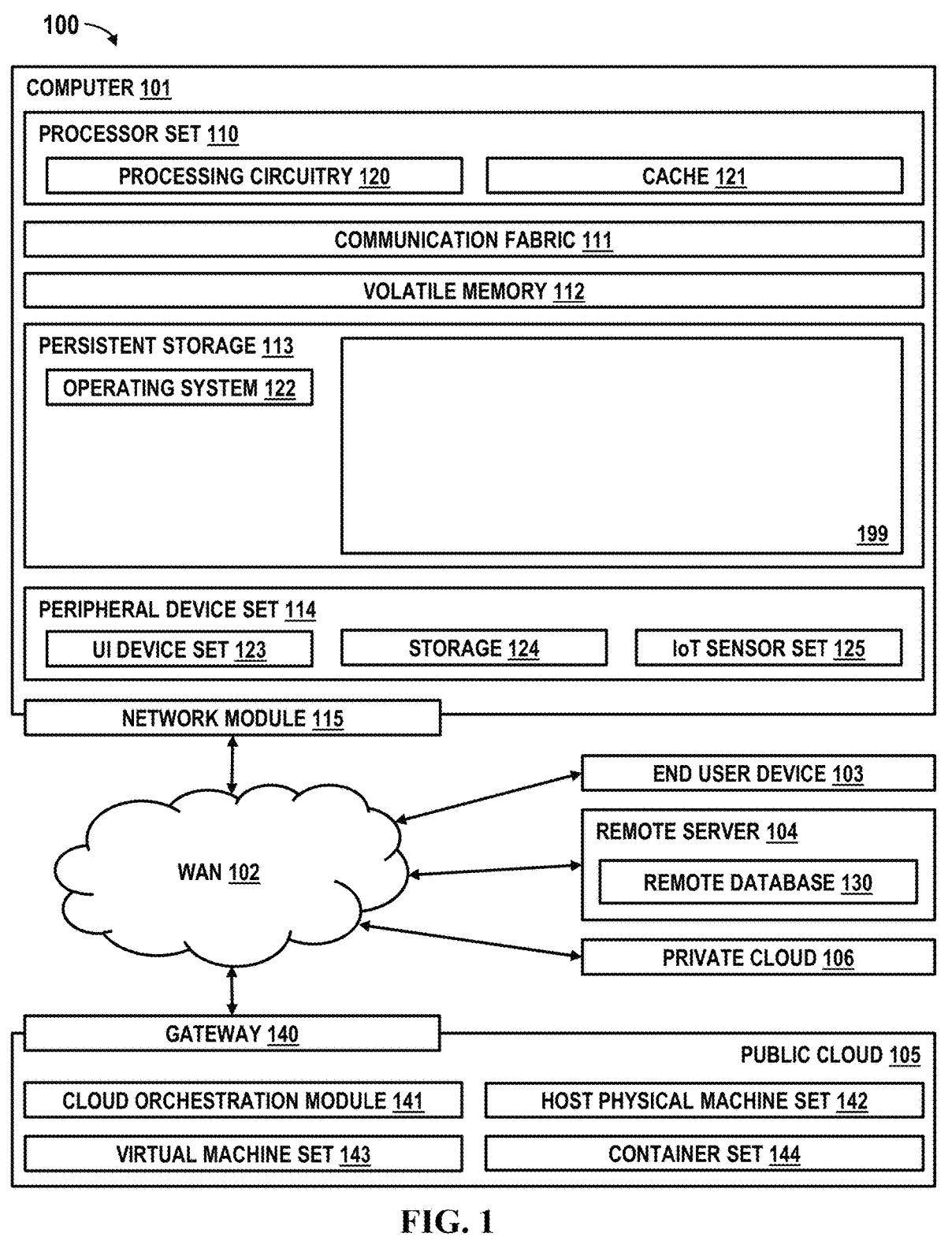

100

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

199

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
| VIRTUAL MACHINE SET 143 | CONTAINER SET 144 |

FIG. 1

Computer System
201

Processor
202

CPU
202A

CPU
202B

CPU
202C

CPU
202D

Memory Bus 203

Memory
204

Cache
224

RAM
222

Storage System
226

Programs 228

Modules 230

I/O Bus Interface 210

I/O Bus 208

Terminal Interface 212

I/O Device Interface 214

Storage Interface 216

Network Interface 218

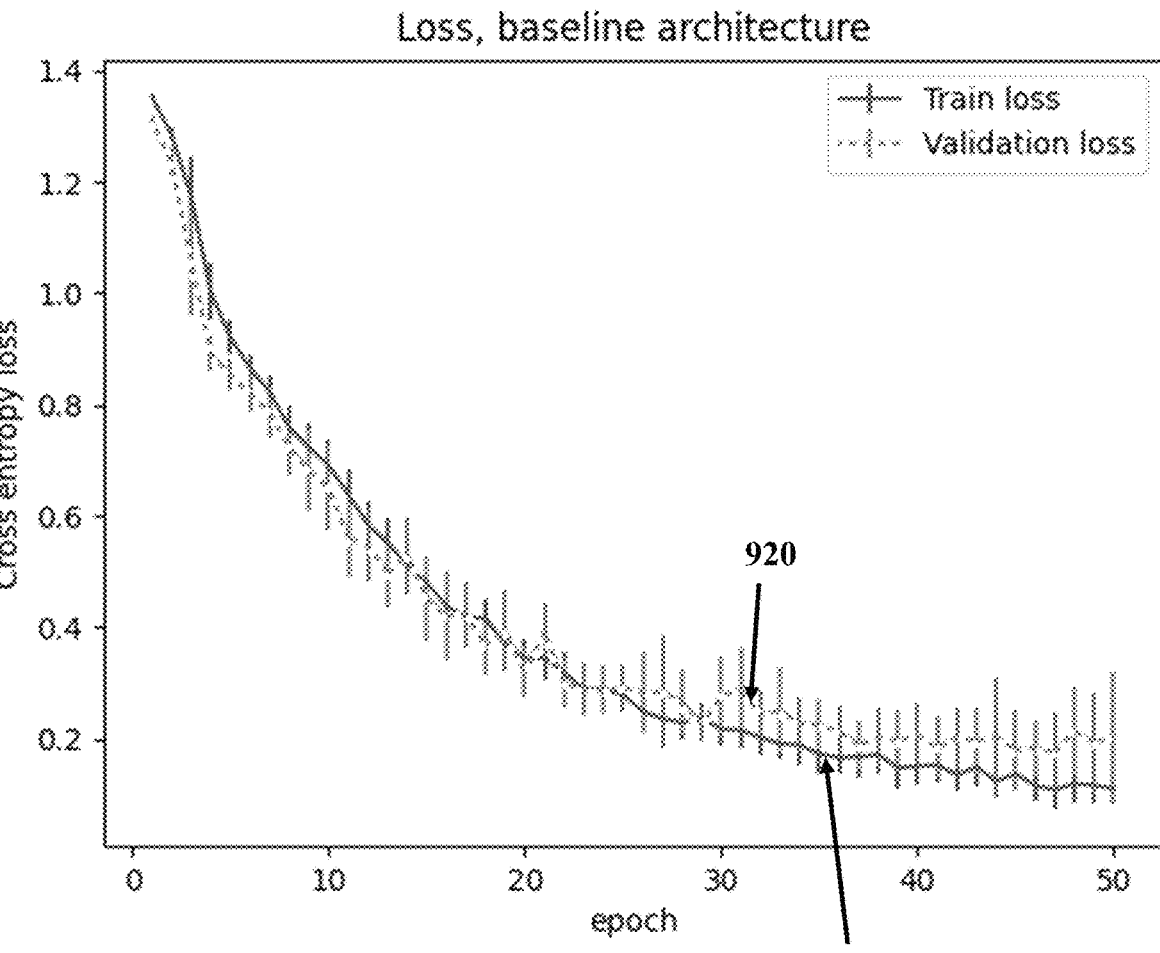
FIG. 9

SPATIAL FREQUENCY SPLITTING FOR CONVOLUTIONAL NEURAL NETWORKS

BACKGROUND

Aspects of the present disclosure relate to spatial frequency splitting for convolutional neural networks.

Convolutional neural networks (CNNs) are a class of deep learning models that have revolutionized the field of computer vision. CNNs are typically designed to process and analyze visual data, such as images and videos, by mimicking the architecture and workings of the human visual system. The main purpose of a CNN is typically to automatically learn and extract meaningful features from input data, which allows it to perform tasks like image classification, object detection, segmentation, etc.

CNNs are based on the concept of convolution, where a set of learnable filters (kernels) are applied to the input data. These filters capture local patterns and features from the input data, such as contours, textures, and shapes. Using convolutional layers, CNNs can efficiently detect and recognize complex patterns at different levels of abstraction. In addition, CNNs contain pooling layers that flatten feature map samples, reduce spatial dimensions, and extract salient features. Through this process, the model achieves translation invariance, which means it can recognize objects regardless of their position in the image.

BRIEF SUMMARY

The present disclosure provides a method, computer program product, and system of spatial frequency splitting for convolutional neural networks. In some embodiments, the method includes allocating, in response to receiving an input tensor of a predetermined shape, a portion of convolution kernels to a predetermined number of spatial frequency bands, replacing the convolution layer in a convolutional neural network with a sequence of band splitting, parallel convolutions, and concatenation, and forming, in response to completing stages for the predetermined number of spatial frequency bands, a final output tensor.

Some embodiments of the present disclosure can also be illustrated by a computer program product comprising a computer readable storage medium having program instructions embodied therewith, the program instructions executable by a processor to cause the processors to perform a method, the method comprising allocating, in response to receiving an input tensor of a predetermined shape, a portion of convolution kernels to a predetermined number of spatial frequency bands, replacing the convolution layer in a convolutional neural network with a sequence of band splitting, parallel convolutions, and concatenation, and forming, in response to completing stages for the predetermined number of spatial frequency bands, a final output tensor.

Some embodiments of the present disclosure can also be illustrated by a system comprising a processor and a memory in communication with the processor, the memory containing program instructions that, when executed by the processor, are configured to cause the processor to perform a method, the method comprising allocating, in response to receiving an input tensor of a predetermined shape, a portion of convolution kernels to a predetermined number of spatial frequency bands, replacing the convolution layer in a convolutional neural network with a sequence of band splitting, parallel convolutions, and concatenation, and forming, in response to completing stages for the predetermined number of spatial frequency bands, a final output tensor.

BRIEF DESCRIPTION OF THE DRAWINGS

FIG. 1 illustrates an example computing environment, according to various embodiments of the present invention.

FIG. 9 depicts an evolution of loss graph for a baseline architecture according to various embodiments of the present invention.

DETAILED DESCRIPTION

Figure 2:
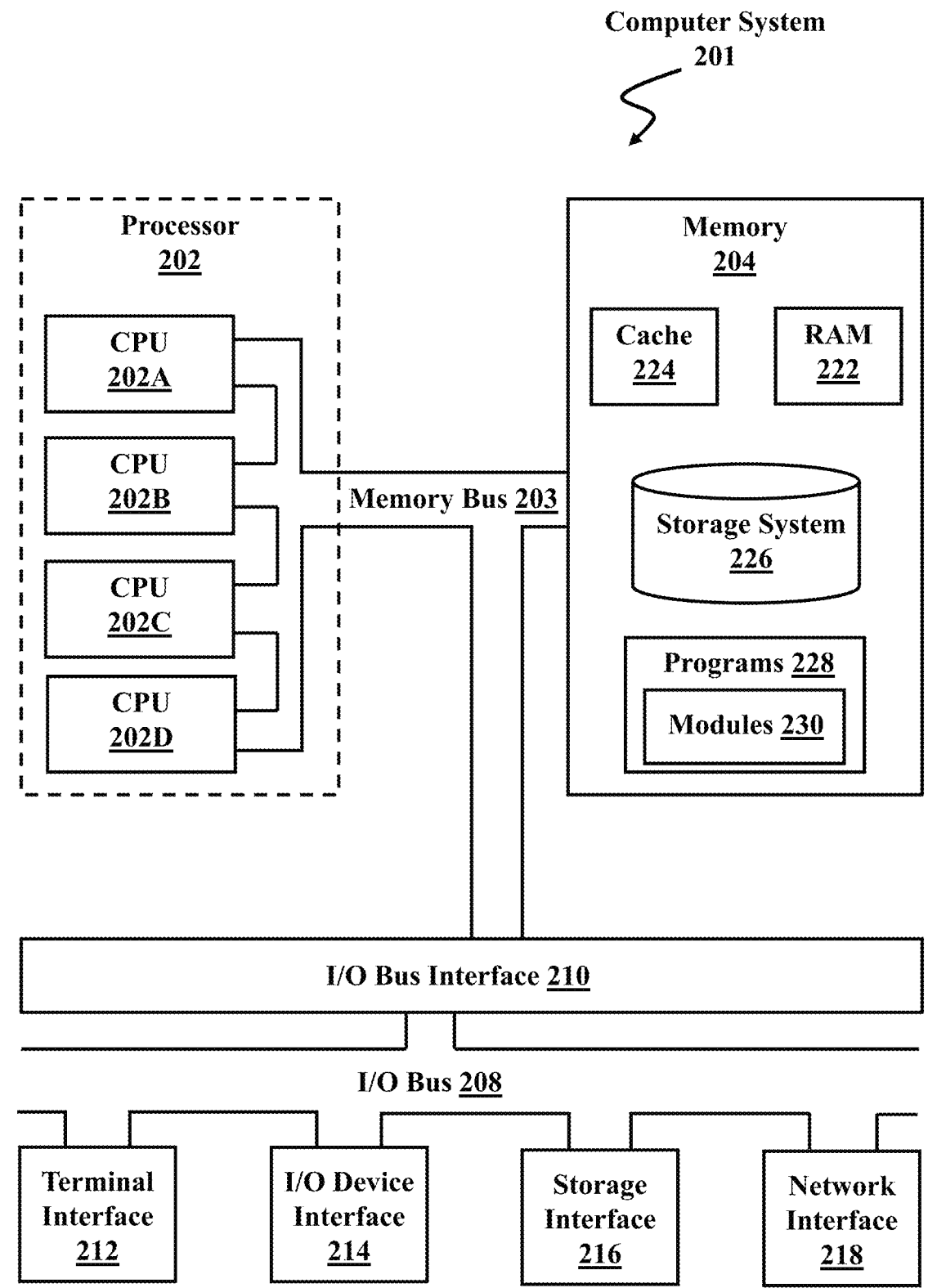
FIG. 2 depicts a computer system according to various embodiments of the present invention.

Aspects of the present disclosure relate to spatial frequency splitting for convolutional neural networks. While the present disclosure is not necessarily limited to such applications, various aspects of the disclosure may be appreciated through a discussion of various examples using this context.

A Convolutional Neural Network (CNN) is a type of machine learning model that is particularly effective for tasks involving visual data such as images or videos. It is typically designed to automatically learn and extract meaningful features from the input data through a series of convolutional and pooling layers.

In some instances, a CNN consists of multiple layers, including an input layer, an output layer, convolutional layers, pooling layers, and fully connected layers. The convolutional layers apply filters or kernels to the input data, convolving them across the spatial dimensions to detect local patterns and features. This process captures relevant information such as edges, textures, or shapes in the data.

The pooling layers downsample the output of the convolutional layers, reducing the spatial dimensions and extracting the most salient features. This helps to retain important information while reducing the computational complexity and avoiding overfitting.

The fully connected layers are responsible for combining the extracted features and making final predictions. These layers connect every neuron from the previous layer to the neurons in the subsequent layer, allowing for complex associations and decision-making based on the learned features.

During the training process, the CNN learns to optimize its internal parameters, known as weights and biases, by minimizing a predefined loss function. This optimization is achieved through a process called backpropagation, where the error or loss is propagated backward through the network, adjusting the weights to improve the model's predictions.

To train a CNN, labeled training data is typically used, where both the input data and the corresponding target labels are known. The network learns to map the input data to the correct labels, enabling it to make accurate predictions on unseen data.

Once trained, the CNN can be used to classify or recognize new, unseen data. It takes in an input, passes it through the layers, and produces an output that represents the predicted class or label for the input data.

CNN's have been used for a wide range of computer vision applications. For example, classification, object detection, and semantic segmentation tasks are routinely performed by neural network architectures based on a series of convolution operations. The rationale behind the design pattern of stacking convolution layers is the compositionality of images. Pixel patterns form low level features that are detected by the first convolution layer. Then, these features form spatial features-of-features that are detected by the second convolution layer, and so on. One problem of convolutional neural networks is their propension to rely heavily on texture, which is part of the high spatial frequency content of images. In some instances, texture refers to the visual patterns or surface characteristics present in an image. Texture is a property that captures the arrangement of pixels, their spatial relationships, and repetitive structures within local image regions. CNNs leverage the concept of texture to learn and recognize distinctive patterns that help in object identification, segmentation, and other computer vision tasks. By analyzing the texture features extracted from images using convolutional layers, CNNs can effectively differentiate between different textures and utilize this information for various image analysis and understanding tasks.

Although such a strategy pays off in terms of speed in finding a good operation point, it might not be optimal. Furthermore, the resulting model will be brittle with respect to small image perturbations such as blurring or adding noise. Humans have a shape bias (as opposed to a texture bias for CNNs) when classifying images. Human classification performances are much less sensitive than CNNs to small image perturbations, as is emphasized by the adversarial noise problem. Accordingly, it may be desirable to cause a CNN to use both low and high spatial frequency information in images.

In some embodiments, a method is proposed to constrain convolution layers in a CNN to learn image features that reside both in low and high spatial frequencies. In some embodiments, a method and system are proposed to design convolutional neural networks (CNNs) where at least one block of band splitting, parallel convolutions and concatenation is used and the band splitting operation separates the input activation tensor based on its spatial frequency content, into at least two bands. In some embodiments, some or all of the convolutional layers follow the band splitting, parallel convolutions and concatenation pattern. In some embodiments, the band splitting parameters are trainable. In some embodiments, the band splitting operation preserves some or all of the information from the input activation tensor.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code 199 configured to train and deploy a CNN that utilizes spatial frequency splitting. In addition to code 199, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code 199, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code 199 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in code 199 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2, illustrated is a high-level block diagram of an example computer system 201 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 201 may comprise one or more CPUs 202, a memory subsystem 204, a terminal interface 212, a storage interface 216, an I/O (Input/Output) device interface 214, and a network interface 218, all of which may be communicatively coupled, directly or indirectly, for inter-component communication via a memory bus 203, an I/O bus 208, and an I/O bus interface unit 210.

The computer system 201 may contain one or more general-purpose programmable central processing units (CPUs) 202A, 202B, 202C, and 202D, herein generically referred to as the CPU 202. In some embodiments, the computer system 201 may contain multiple processors typical of a relatively large system; however, in other embodiments the computer system 201 may alternatively be a single CPU system. Each CPU 202 may execute instructions stored in the memory subsystem 204 and may include one or more levels of on-board cache.

System memory 204 may include computer system readable media in the form of volatile memory, such as random access memory (RAM) 222 or cache memory 224. Computer system 201 may further include other removable/non-removable, volatile/non-volatile computer system storage media. By way of example only, storage system 226 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 204 can include flash memory, e.g., a flash memory stick drive or a flash drive. Memory devices can be connected to memory bus 203 by one or more data media interfaces. The memory 204 may include at least one program product having a set (e.g., at least one) of program modules that are configured to carry out the functions of various embodiments.

One or more programs/utilities 228, each having at least one set of program modules 230 may be stored in memory 204. The programs/utilities 228 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 228 and/or program modules 230 generally perform the functions or methodologies of various embodiments.

Although the memory bus 203 is shown in FIG. 2 as a single bus structure providing a direct communication path among the CPUs 202, the memory subsystem 204, and the I/O bus interface 210, the memory bus 203 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 210 and the I/O bus 208 are shown as single respective units, the computer system 201 may, in some embodiments, contain multiple I/O bus interface units 210, multiple I/O buses 208, or both. Further, while multiple I/O interface units are shown, which separate the I/O bus 208 from various communications paths running to the various I/O devices, in other embodiments some or all of the I/O devices may be connected directly to one or more system I/O buses.

In some embodiments, the computer system 201 may be a multi-user mainframe computer system, a single-user system, or a server computer or similar device that has little or no direct user interface, but receives requests from other computer systems (clients). Further, in some embodiments, the computer system 201 may be implemented as a desktop computer, portable computer, laptop or notebook computer, tablet computer, pocket computer, telephone, smartphone, network switches or routers, or any other appropriate type of electronic device.

It is noted that FIG. 2 is intended to depict the representative major components of an exemplary computer system 201. In some embodiments, however, individual components may have greater or lesser complexity than as represented in FIG. 2, components other than or in addition to those shown in FIG. 2 may be present, and the number, type, and configuration of such components may vary.

In some embodiments, the present disclosure modifies the architecture of a CNN by replacing some or all convolution layers with a stack of band splitting, parallel convolutions, and concatenation.

CNNs are computing systems inspired by the structure and function of the visual cortex in animal brains. These networks excel in tasks such as image recognition by leveraging their ability to learn from examples without requiring explicit programming. In the context of image recognition, CNNs can be trained to identify specific objects, like cats, by analyzing labeled example images and utilizing the obtained insights to recognize cats in other images.

In some embodiments, CNNs can also be employed to discover new knowledge sources. Through a repetitive process, training data is propagated through the network, output errors are identified, and adjustments are made to address these errors. The neural network learns to recognize patterns in the input data by comparing them to patterns identified by human annotators, thus assessing the network's accuracy. When discrepancies arise between the network's identified patterns and the human-labeled patterns, the network architecture is reviewed to identify the neurons responsible for the mismatch. These specific neurons are then updated, typically by adjusting the weights applied to their respective functions, with the aim of reducing their contribution to the pattern mismatch. Random changes may be introduced to update the neurons, and this process iterates gradually, progressively reducing the number of neurons involved in the mismatch. Eventually, the neural network's output undergoes a transformation. If the new output matches the expected output based on human annotator review, the network is considered trained on that data.

Once a CNN has undergone sufficient training using specific datasets, it can be applied to detect patterns in analogous live data. This live data, related to the same subject matter as the training data, has not been previously reviewed by human annotators. The CNN's pattern recognition capabilities can then be harnessed for various applications. For example, a trained CNN can analyze live data and predict the probability of future events associated with the subject matter.

In some embodiments, the band splitting takes as input a tensor of shape (N, C, H, W) and outputs two or more tensors of shape (e.g., N, $C_1$, $H_1$, $W_1$ and N, $C_2$, $H_2$, $W_2$, where N is the same size for both), each covering a spatial spectral band. In some instances, N stands for the batch size or the number of samples in a mini-batch. In CNNs, data is typically processed in batches to improve computational efficiency. In some instances, C represents the number of channels or depth of the input volume. In an RGB image, for example, there are three channels corresponding to the red, green, and blue color channels. In some embodiments, the C values need not be the same for both of the split tensors. The number of input channels is C_in, and the number of output channels is C_out (or C_i and C_{i+1} to emphasize the i-th layer). In some instances, H denotes the height of the input volume or feature map. In the case of an image, H corresponds to the number of pixels along the vertical axis. In some instances, W represents the width of the input volume or feature map. In the case of an image, W corresponds to the number of pixels along the horizontal axis. In some instances, c_out refers to the number of filters or convolutional kernels used in a layer. Each filter performs a convolution operation on the input volume to extract specific features. To summarize, herein N is the batch size, C represents the number of input channels, H denotes the height, and W denotes the width.

In some instances, for a two bands splitting, a Gaussian filter with trainable parameter "s" will produce the low pass tensor. The high pass tensor will be obtained by the difference between the input tensor and the low pass tensor. This method facilitates losing less information, since the input tensor can be reconstructed as the sum of the low pass and the high pass tensors. The parameter "s" represents the standard deviation of the Gaussian filter. The Gaussian filter is a commonly used filter in image processing and computer vision tasks. The Gaussian filter is applied to an input image or tensor to perform a smoothing operation, effectively reducing noise and suppressing high-frequency components.

In some instances, the standard deviation, denoted by "s," determines the spread or blurring effect of the Gaussian filter. A larger value of "s" results in a wider kernel and more pronounced blurring, while a smaller value of "s" leads to a narrower kernel and less blurring. In the context of the statement, the Gaussian filter with the trainable parameter "s" means that the standard deviation of the filter can be learned or adjusted during the training process of a neural network. By making "s" trainable, the network can adaptively determine the optimal blurring level or low-pass characteristics required for a specific task.

In some embodiments, the parallel convolutions are a set of convolution layers that may each be allocated to one of the spectral bands. For example, for a two bands splitting, two convolution layers may take as input the low pass and the high pass tensor respectively. This configuration forces each convolution layer to learn features that reside either in the low frequency or the high frequency band.

In some embodiments, the concatenation stacks the tensors output by the convolutions into a single tensor, along the channel axis. The concatenated tensor can then be passed to the next stage, typically a pooling layer and a non-linearity.

In some embodiments, the present disclosure improves a CNN system by increasing the accuracy of a classification CNN, while keeping almost the same number of training parameters, as demonstrated by the experimental results described below.

In some embodiments, the present disclosure improves a CNN system by having each convolution layer (and not only the first one) split according to spatial frequency bands thereby forcing each stage to exploit low and high frequency features.

In some embodiments, the present disclosure improves a CNN system with a trainable band splitting operation. In the case of a Gaussian filter, the s parameter is learned by gradient descent.

In some embodiments, the present disclosure improves a CNN system by creating a band splitting operation that keeps all or more (compared to previous methods) of the information of the input tensor, by design and does not discard the texture information of the training images.

Figures 3, 4:
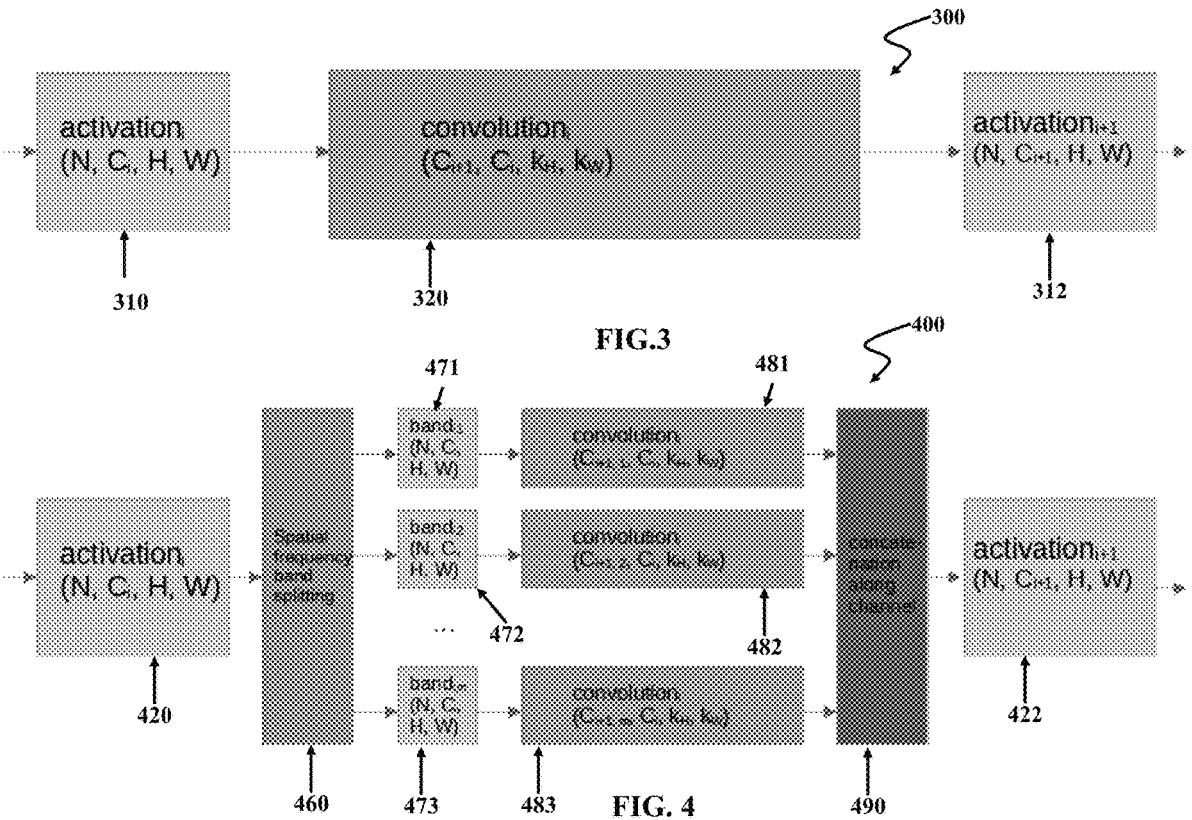
FIG. 3 depicts activation/convolution layers in a basic CNN without band splitting according to various embodiments of the present invention.
FIG. 4 depicts a CNN that utilizes spatial frequency band splitting according to various embodiments of the present invention.

FIG. 3 depicts activation/convolution layers in a basic CNN without band splitting. In some instances, a convolutional layer, such as depicted convolution layer 320 performs the primary operation of convolving input data with a set of learnable filters or kernels. The convolution operation applies these filters across the input volume to extract local features, capturing spatial relationships.

In some instances, an activation layer in a CNN introduces non-linearity to the network by applying an activation function element-wise to the output of a convolutional layer or any other layer. The activation function operates on each neuron's input to determine its output, which is then passed as the input to the next layer. In some instances, an activation layer, such as activation layer 310 or 312, apply an activation function element-wise to introduce non-linearity into the network. Common activation functions include ReLU (Rectified Linear Unit), sigmoid, and tanh.

In some instances, in CNN 300 activation layers (e.g., activation layer 310 and activation layer 312) and convolution layers (e.g., convolution layer 320) are utilized multiple times to create a deep hierarchical architecture that learns increasingly complex features. Convolution layers extract local features by convolving input data with learnable filters. The output feature maps undergo an activation layer, which introduces non-linearity to capture complex relationships. These layers are typically stacked one after another to form deep networks, allowing the network to learn hierarchical representations. As the information flows through the network, lower layers capture simple features like edges and textures, while deeper layers combine these features to learn more abstract and high-level representations. The repeated application of activation and convolution layers enables the network to progressively learn and extract intricate patterns, improving its ability to classify or analyze the input data.

FIG. 4 depicts a CNN architecture 400 that utilizes spatial frequency band splitting. In some embodiments, the convolution layer 320 of FIG. 3 is replaced with a sequence of band splitting, parallel convolutions, and concatenation. In some embodiments, the system may allocate part of the convolution kernels to a preset number of spatial frequency bands. This allocation is implemented by replacing each convolution layer by a sequence of band splitting 460 into multiple bands (e.g., bands 471, 472, and 473), parallel convolutions (e.g., convolutions 481, 482, and 483), and concatenation 490. In some embodiments, the sequence may also include activation layers 420 and 422. The proposed architecture explicitly constrains some of the computational budget to be allocated to spatial frequency bands that unconstrained architectures tend to ignore, because shortcuts can be found by exploiting the texture information only.

In some embodiments, spatial frequency band splitting refers to the process of decomposing the input image or feature maps into different frequency components using convolutional filters. In some embodiments, a spatial frequency band splitting technique is used to analyze and extract information at different scales or levels of detail.

In some embodiments, spatial frequency band splitting is performed to the input data in multiple sets of filters with different spatial sizes. Each set of filters focuses on capturing features at specific frequency bands, ranging from low to high frequencies. Low-frequency filters typically have larger receptive fields and capture global patterns and coarse details, while high-frequency filters have smaller receptive fields and emphasize fine-grained details and local patterns.

In some instances, low frequencies typically correspond to frequency ranges below a certain threshold. While the exact range can vary depending on the application or the specific spatial frequency analysis technique, it often includes frequencies up to approximately 1-5 cycles per image or lower. Low-frequency components capture the broad, global patterns and coarse variations in an image.

In some instances, high frequencies refer to frequency ranges above a certain threshold. The exact range may vary, but it generally includes frequencies above 1-5 cycles per image or higher. High-frequency components represent rapid changes, fine details, and localized variations in an image, such as edges, textures, or small-scale patterns.

In some embodiments, by applying filters with different spatial sizes, the CNN can effectively extract information at various scales and resolutions. The low-frequency components tend to capture the overall structure and global context, while the high-frequency components capture fine details and local variations.

In some embodiments, spatial frequency band splitting can help CNNs to analyze images or feature maps at different levels of abstraction and granularity. Spatial frequency band splitting allows the network to encode and process information from different frequency ranges separately, providing a more comprehensive representation of the input data. In some embodiments, spatial frequency band splitting may be used in computer vision tasks such as image analysis, object detection, and texture recognition, where capturing both global and local patterns is helpful for accurate understanding and classification.

Figure 5A:
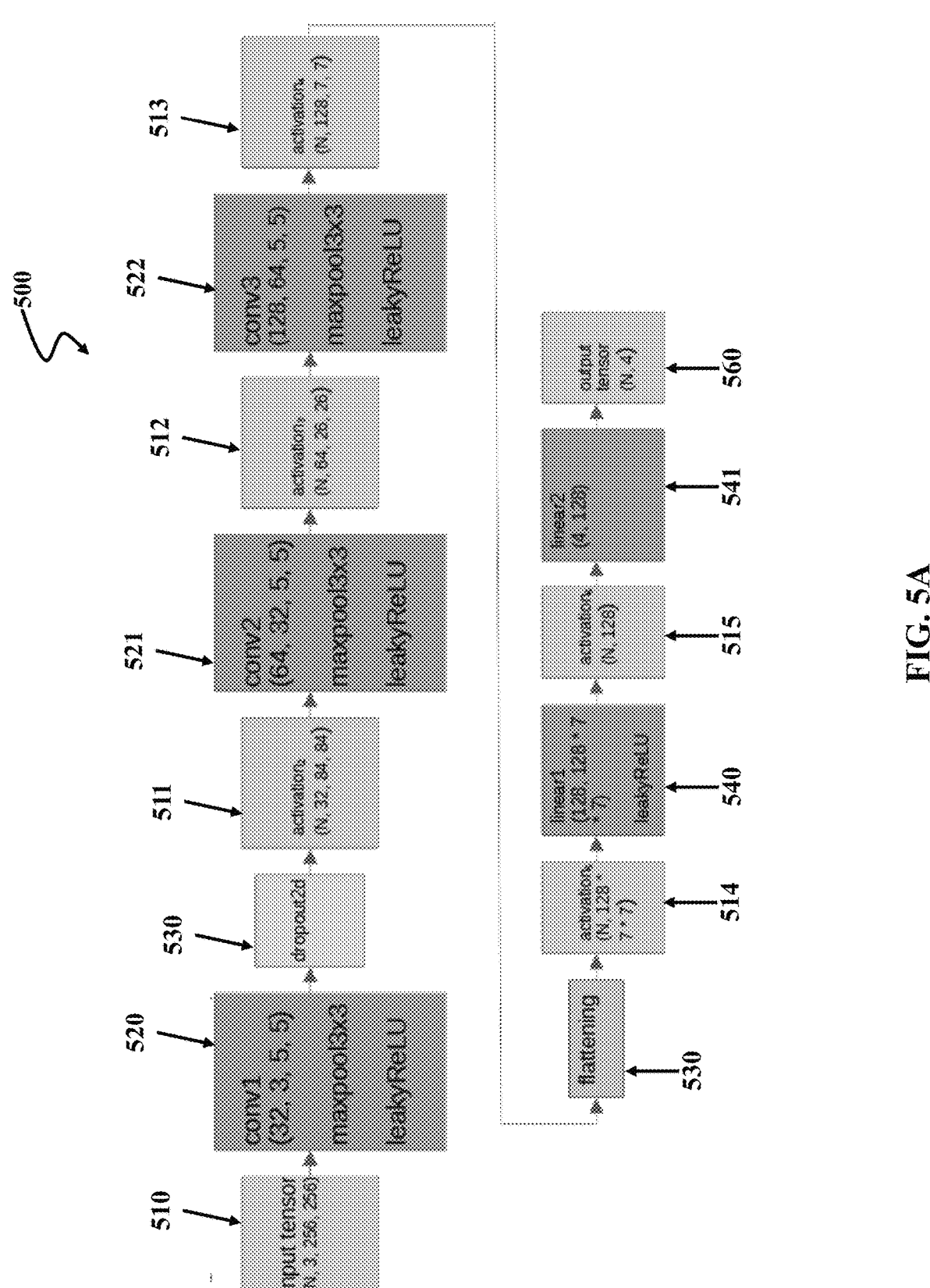
FIG. 5A depicts the baseline architecture for the experiment according to various embodiments of the present invention.

To demonstrate the effectiveness of the proposed system and method, a pair of CNN architectures, one with spatial frequency band splitting and one without were compared with an experiment. FIG. 5A shows the baseline architecture 500 for the experiment. The baseline architecture 500 has three convolution layers, followed by a bottleneck vector of 128 latent variables. A final linear layer then projects this vector on a 4-tuple, representing the logic outputs for a classifier with 4 classes. FIG. 5A uses a batch of (3, 256, 256) tensors as input and outputs a batch of 4D vectors. FIG. 5A includes:

Input tensor 510 (N, 3, 256, 256): The input tensor represents the input data, which consists of a batch of tensors with a shape of (N, 3, 256, 256). N represents the batch size, 3 indicates the number of input channels (assuming RGB images), and 256×256 represents the height and width of the input images.

Conv1 520 (32, 3, 5, 5): Conv1 refers to the first convolutional layer. It consists of 32 filters with a size of (3, 5, 5), meaning each filter has a depth of 3 (matching the input channels) and a spatial size of 5×5.

Dropout 2D 530: Dropout is a regularization technique that randomly sets a fraction of input units to zero during training. Dropout 2D specifically applies dropout to 2D feature maps, helping prevent overfitting.

Activation2 511 (N, 32, 84, 84): This represents the activation tensor obtained after the application of a convolutional layer and dropout in the neural network pipeline.

Conv2 521 (64, 32, 5, 5): Conv2 refers to the second convolutional layer with 64 filters. Each filter has a depth of 32 (matching the number of input channels from Activation2) and a spatial size of 5×5.

Activation3 512 (N, 64, 26, 26): This represents the activation tensor obtained after the application of a convolutional layer and dropout in the neural network pipeline.

Conv3 522 (128, 64, 5, 5): This indicates the third convolutional layer with 128 filters. Each filter has a depth of 64 (matching the number of input channels from Activation3) and a spatial size of 5×5.

Activation4 513 (N, 128, 7, 7): This represents the activation tensor obtained after the application of a convolutional layer and dropout in the neural network pipeline.

Flattening 530: This operation flattens the 4D feature maps into a batch of N vectors of length 128*7*7.

Activation5 514 (N, 128, 7*7): This represents the activation tensor obtained after the application of a convolutional layer and dropout in the neural network pipeline.

Linear1 540 (128, 128*7*7): This denotes the first fully connected (linear) layer. It has 128 neurons and connects all the activations from Activation5 514.

Activation6 515 (N, 128): This represents the activation tensor obtained after the application of a convolutional layer and dropout in the neural network pipeline.

Linear2 541 (4, 128): This denotes the second fully connected (linear) layer. It has 4 neurons (matching the desired output size) and connects to the activations from Activation6.

Output Tensor 560 (N, 4): This is the final output of the CNN, representing a batch of 4D vectors with a size of (N, 4).

In some instances, MaxPool3×3 (as shown in Conv1 520, Conv2 521, and Conv3 522) refers to a pooling operation commonly used in CNNs. MaxPool3×3 involves dividing the input feature map into non-overlapping regions of size 3×3 and selecting the maximum value within each region. This process reduces the spatial dimensions of the feature map while retaining the most prominent features. By downsampling the feature map, MaxPool3×3 helps in reducing the computational complexity of the network and extracting the most salient information.

In some instances, LeakyReLU (as shown in Conv1 520, Conv2 521, Conv3 522, Linear1 540, and Linear2 541) is an activation function often used in neural networks, including CNNs. LeakyReLU is a variant of the Rectified Linear Unit (ReLU) activation function. The LeakyReLU introduces a small, non-zero slope to the negative region of the function, allowing for the activation of neurons even when the input is negative. This helps address the "dying ReLU" problem where ReLU-based neurons can get stuck at zero during training, resulting in the inability to learn. By allowing a small negative output for negative inputs, LeakyReLU helps mitigate this problem and can improve the learning capacity of the network. The slope value determines the leakiness, typically set to a small constant like 0.01.

In some instances, concatenation ("concat" herein) is an operation in neural networks that combines multiple feature maps or tensors along a specified dimension. In CNNs, concatenation is often used to merge feature maps from different layers. It retains the spatial dimensions while extending the channel dimension. By concatenating feature maps A and B, for example, along the channel dimension, the resulting feature map has a larger channel dimension but the same spatial dimensions. Concatenation enables the network to incorporate information from multiple sources or stages, allowing for more complex representations and facilitating tasks like feature fusion and multi-scale processing.

In some embodiments, the proposed architecture replaces the three convolution layers of the baseline architecture with a sequence of band splitting, parallel convolutions, and concatenation. For each layer, the band splitting separates the input tensor into two bands. The low frequency band is obtained by convolution with a Gaussian filter characterized by a trainable standard deviation s. The kernel size for the Gaussian filter is width set to 6 s, rounded to the closest odd integer. The high pass band is obtained by subtracting the low pass tensor from the input tensor. The number of kernels allocated to each band is half the number of kernels of the corresponding convolution layer in the baseline architecture. This keeps the number of trainable parameters the same for both bands.

In some instances, the term "7*7" refers to the spatial size of the feature maps after the previous operations in the architecture. Specifically, it represents the height and width dimensions of the feature maps.

In the given exemplary architecture, after the Conv3 layer and Activation4 layer, the feature maps have a size of (N, 128, 7, 7). Here, "N" represents the batch size, "128" represents the number of channels, and "7" represents the spatial dimensions of both the height and width.

In this example, the term "128*7*7" represents a vector of lengths (128*7*7)=6272.

In the given exemplary architecture, after the Activation4 layer, the feature maps have a size of (N, 128, 7, 7), where "N" represents the batch size, "128" represents the number of channels, and "7" represents the spatial dimensions of both the height and width.

In some instances, the total number of elements in the feature maps is calculated by multiplying the number of channels by the height and width dimensions. In this case, it would be 128×7×7=6272. For example, "128*7*7" denotes that there are 6272 elements in the feature maps after the Activation4 layer.

Figure 5B:
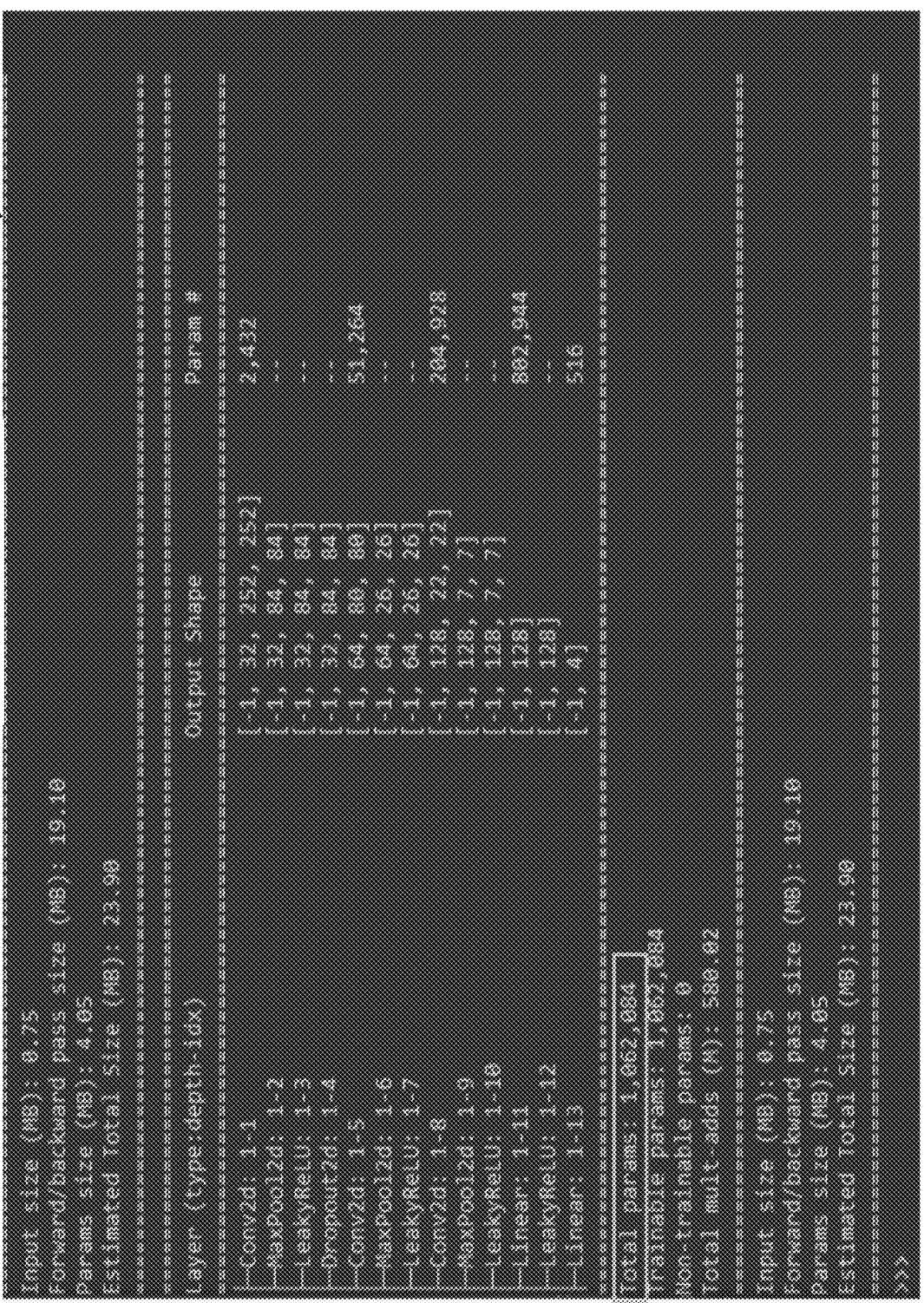
FIG. 5B depicts a text summary of the basic architecture according to various embodiments of the present invention.

FIG. 5B depicts a text summary 550 of the basic architecture 500, described above for FIG. 5A.

Figure 6A:
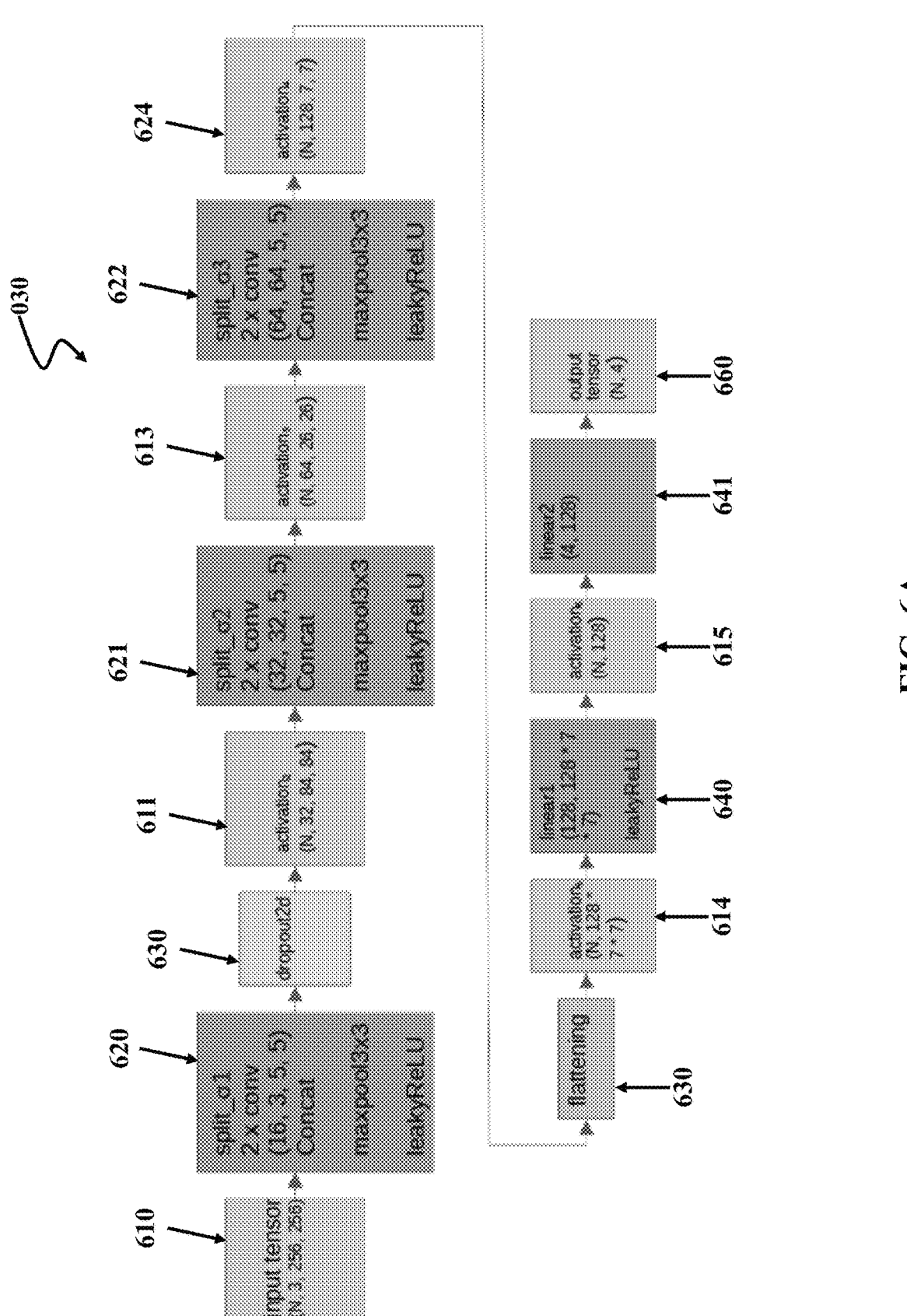
FIG. 6A depicts a proposed CNN architecture with split bands for the experiment according to various embodiments of the present invention.

FIG. 6A depicts an example proposed CNN architecture 600 with split bands used in the experiment. In some embodiments, architecture 600 takes a batch of (3, 256, 256) tensors as input and outputs a batch of 4D vectors. Many of the components to architecture 600 are similar to architecture 500. FIG. 6 includes:

Input Tensor 610 (N, 3, 256, 256): the input tensor represents the input data, which consists of a batch of tensors with a shape of (N, 3, 256, 256). N represents the batch size, 3 indicates the number of input channels (assuming RGB images), and 256×256 represents the height and width of the input images.

Split_σ1 620 with a 2×Conv (16, 3, 5, 5): Split refers to the first split convolutional layer. It consists of using two layers each with 16 filters with a size of (3, 5, 5), meaning each filter has a depth of 3 (matching the input channels) and a spatial size of 5×5.

Dropout 2D 630: Dropout is a regularization technique that randomly sets a fraction of input units to zero during training. Dropout 2D specifically applies dropout to 2D feature maps, helping prevent overfitting.

Activation2 611 (N, 32, 84, 84): Activation2 611 (N, 32, 84, 84): This represents the activation tensor obtained after the application of a dropout or split convolutional layer and dropout in the neural network pipeline.

Split_σ2 621 with a 2×Conv (32, 32, 5, 5): This refers to the second split convolutional layer. It consists of using two layers each with 32 filters. Each filter has a depth of 32 (matching the number of input channels from Activation2) and a spatial size of 5×5.

Activation3 613 (N, 64, 26, 26): This represents the activation tensor obtained after the application of a dropout or split convolutional layer and dropout in the neural network pipeline.

Split_σ3 622 with a 2×Conv (64, 64, 5, 5): This refers to the third split convolutional layer. It consists of using two layers each with 64 filters. Each filter has a depth of 64 (matching the number of input channels from Activation3) and a spatial size of 5×5.

Activation4 624 (N, 128, 7, 7): This represents the activation tensor obtained after the application of a dropout or split convolutional layer and dropout in the neural network pipeline.

Flattening 630: This operation flattens the 4D feature maps into a 2D representation, resulting in an output of size (N, 128*7*7).

Activation5 614 (N, 128, 7*7): This represents the activation tensor obtained after the application of a dropout or split convolutional layer and dropout in the neural network pipeline.

Linear1 640 (128, 128*7*7): This denotes the first fully connected (linear) layer. It has 128 neurons and connects all the activations from Activation5.

Activation6 615 (N, 128): This represents the activation tensor obtained after the application of a dropout or split convolutional layer and dropout in the neural network pipeline.

Linear2 641 (4, 128): This denotes the second fully connected (linear) layer. It has 4 neurons (matching the desired output size) and connects to the activations from Activation6.

Output Tensor 660 (N, 4): This is the final output of the CNN, representing a batch of 4D vectors with a size of (N, 4).

Figure 6B:
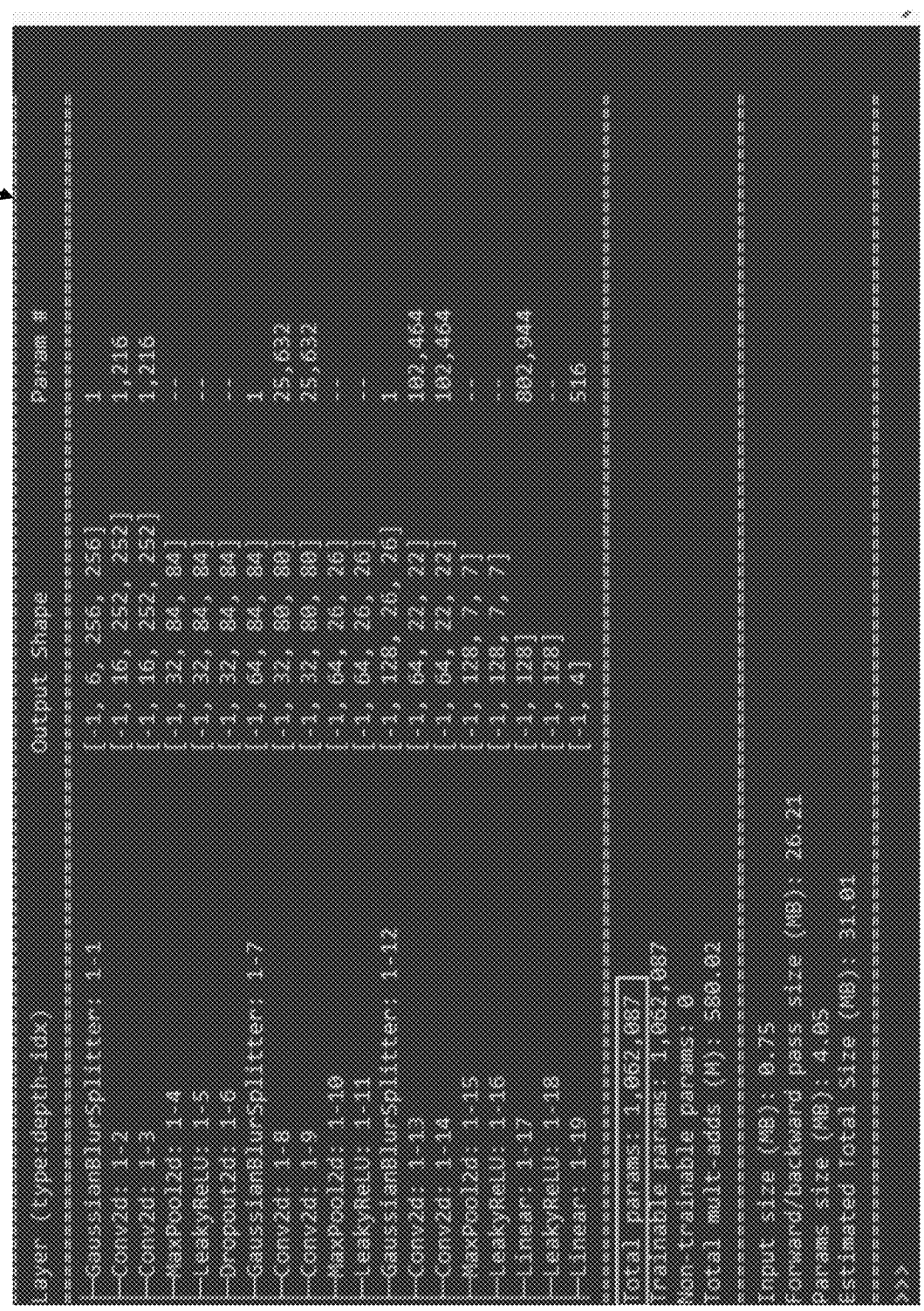
FIG. 6B depicts a text summary of a proposed CNN architecture with split bands according to various embodiments of the present invention.
Figure 7A:
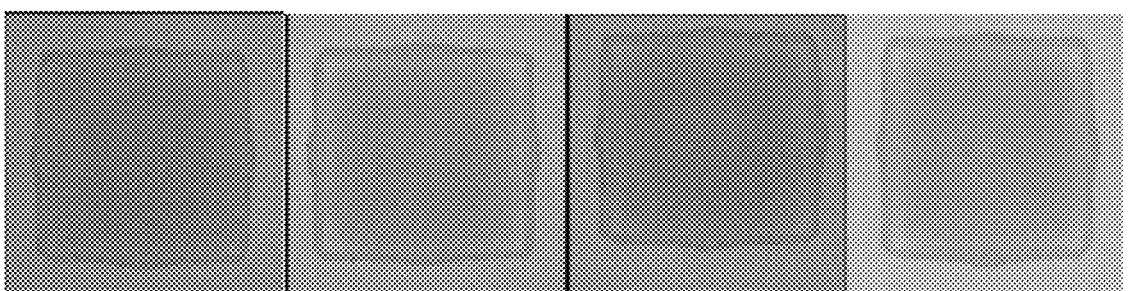
FIGS. 7A, 7B, 7C, and 7D depicts examples from image dataset which both architectures were trained on according to various embodiments of the present invention.
Figure 7B:
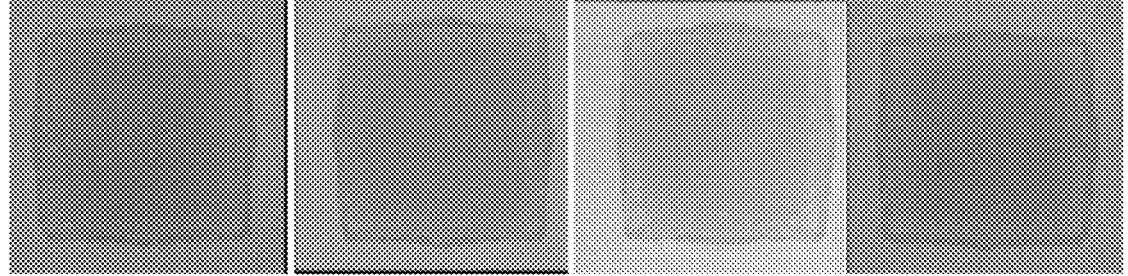
Figure 7C:
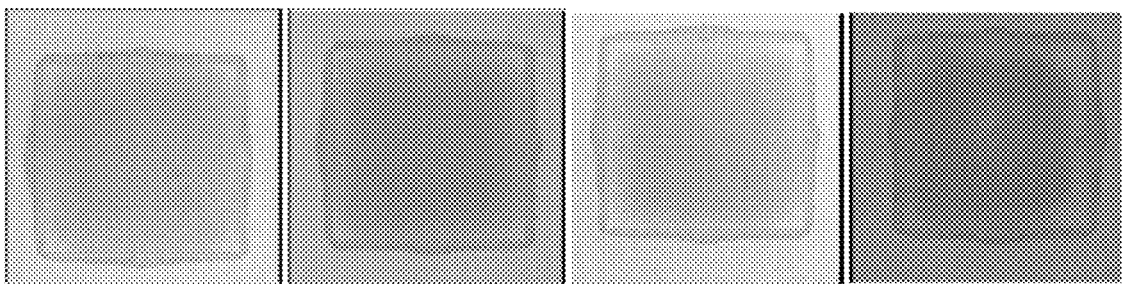
Figure 7D:
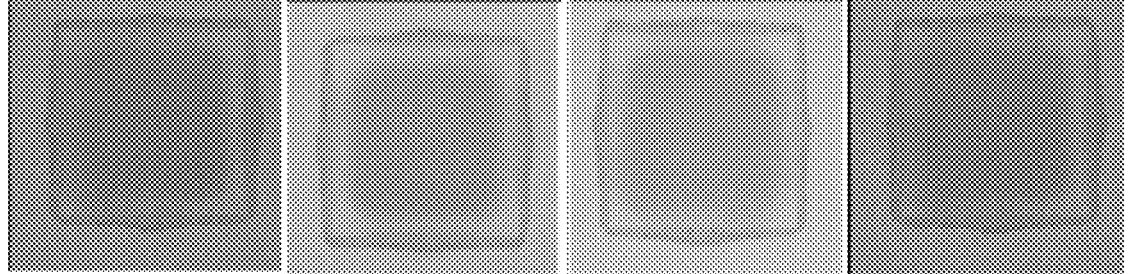

FIG. 6B shows a text summary 699 of a proposed CNN architecture 600 with split bands. Out of more than one million trainable parameters, the proposed architecture 600 has only three more trainable parameters than the basic architecture 500. The difference is the three σ values of the band splitting operations.

FIG. 7A-D depicts examples from an image dataset which both architecture 500 and architecture 600 were trained on. The image dataset was obtained by ultrasonic probing of electronic modules, at the junction of the chip and the metal lid. The task for each architecture was to classify the images in 4 classes: 'good' in FIG. 7A, 'dendrites' in FIG. 7B, 'spots' in FIG. 7C, and 'eclipse' in FIG. 7D. Classes 'dendrites' and 'spots' differ from the class 'good' because of small features or texture. This information lies in the high spatial frequency band. The class 'eclipse', on the other hand, differs from the class 'good' by the presence of a wide bright area in the chip periphery. This information is more likely to lie in the low spatial frequency band. The training and validation set had 1000 images of each class (4000 in total). 20% of the images were randomly selected to be the validation set. The images were created by randomly augmenting an unbalanced dataset of 249 images. Augmentation operations included luminosity perturbation, horizontal and vertical flipping, and random orientation change.

Figure 8:
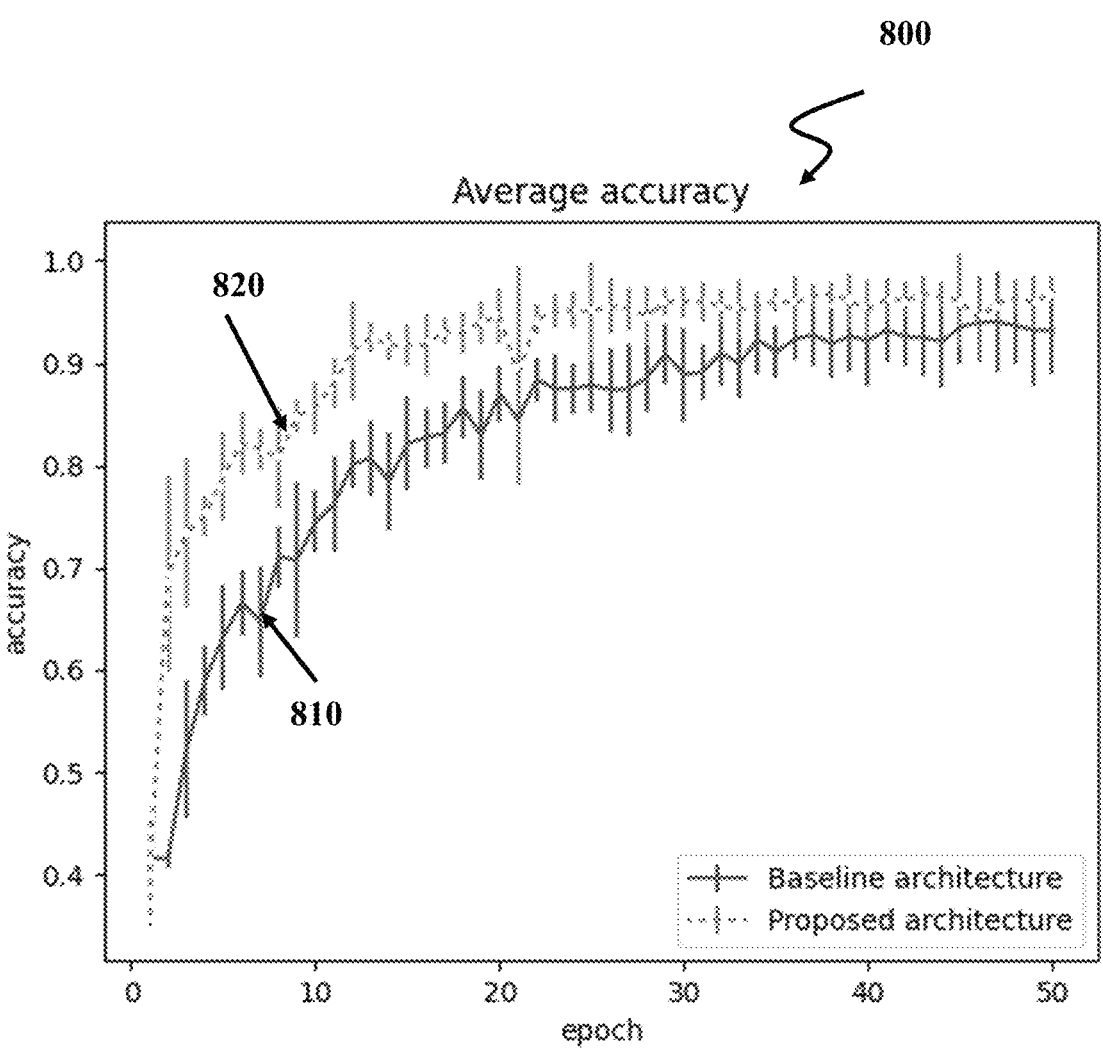
FIG. 8 depicts shows the average accuracy graph according to various embodiments of the present invention.

FIG. 8 depicts the average accuracy graph 800 (error bars at +/−2 s) over the 30 runs. The average accuracy graph 800 depicts accuracy (y-axis) and training epochs (x-axis). Additionally, the average accuracy graph 800 depicts the baseline CNN architecture curve 810 (generated using architecture 500) and the CNN architecture curve 820 with split bands (generated using architecture 600). The proposed architecture 600 stabilizes at a higher accuracy (0.97) than the baseline architecture 500 (0.94). The average accuracy graph 800 for CNN architectures represents the performance of the network over multiple training epochs. With the x-axis representing the epochs and the y-axis representing the accuracy, the graph provides a visual representation of how the accuracy of the network evolves over time during training.

In some instances, in the initial stages of training, the accuracy might be relatively low as the network's parameters are randomly initialized and the model is yet to learn meaningful representations. As training progresses, the network starts to improve its performance (e.g., accuracy). This improvement is reflected by an upward trend in the graph.

In some instances, as the training continues, the average accuracy graph 800 shows a steady increase until it plateaus. This plateau indicates that the network has reached its optimal performance, where further training does not significantly improve the accuracy. The average accuracy graph 800 shows minor fluctuations or small variations around this plateau due to factors such as data variability and network optimization. CNN architecture curve 820 with split bands demonstrates a higher accuracy both in the initial stages of training and after the curves plateau and uses essentially the same resources as the architecture for curve 810.

Figure 10:
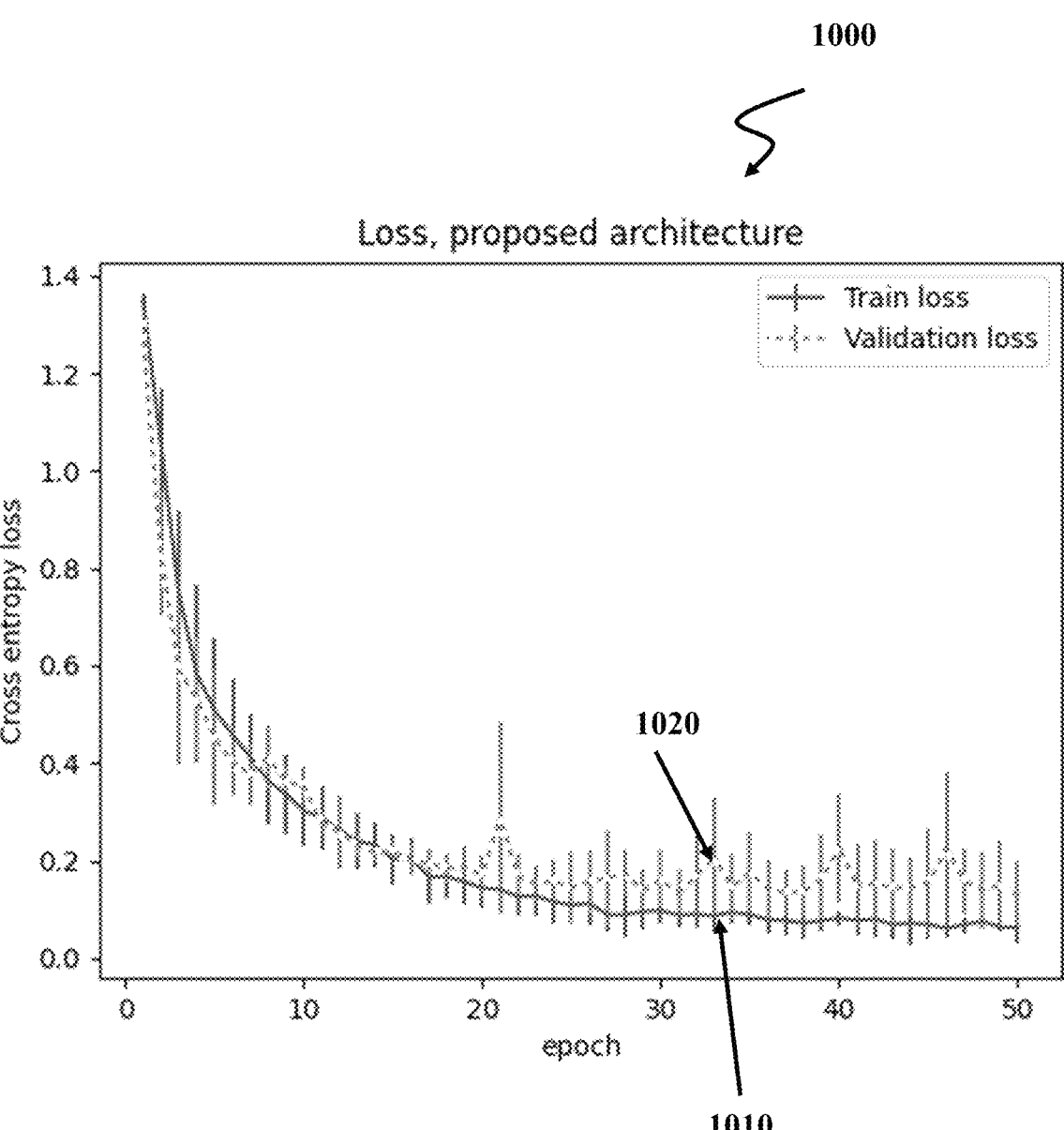
FIG. 10 depicts an evolution of loss graph for a CNN architecture with split bands according to various embodiments of the present invention.

FIG. 9 depicts an evolution of loss graph 900 for baseline architecture 500 and FIG. 10 depicts an evolution of loss graph 1000 for CNN architecture 600 with split bands. The evolution of loss graphs 900 and 1000 have an x-axis representing the epochs and the y-axis representing the cross-entropy loss and provides insights into how the loss function changes during the training process.

In some instances, in graphs 900 and 1000, the loss value is high as the network's initial parameters are randomly assigned, because the models (generated by architectures 500 and 600) have not yet learned meaningful patterns from the data. As the training progresses, the network starts to adjust its parameters based on the optimization algorithm (e.g., gradient descent), and the loss gradually decreases. This downward trend in the loss graph indicates that the network is getting closer to finding an improved solution.

When comparing the loss lines generated using architecture 600, namely loss line 1020, to the loss lines generated using architecture 500, specifically loss line 920, the former demonstrates better characteristics than the latter.

The validation loss line 1020, obtained from architecture 600, initially mirrors the validation loss line 920 as both are initialized with relatively high values. However, as training progresses, validation loss line 1020 exhibits a smoother and steeper descent compared to validation loss line 920. This indicates that the model built on architecture 600 is learning more efficiently and adapting its parameters better to minimize the loss.

The discrepancy between the characteristics of the two validation loss lines (1020 and 920) underscores the improvement of architecture 600 in influencing the model's performance. Architecture 600 demonstrates superior characteristics in terms of faster convergence and overall lower loss values, indicating its potential for better generalization and more accurate predictions.

In some instances, the validation loss lines (1020 and 920) and the training loss lines (910 and 1010) serve different purposes. The training loss lines measure the model's fit to the training data and are used to optimize its parameters. They show how well the model is improving on the training data as training progresses. The validation loss lines estimate the model's generalization performance on unseen data and detect overfitting or underfitting.

The proposed system could be implemented in any neural network architecture having at least one convolution layer. The family of tasks that could benefit from the proposed invention cover image classification, object detection, and semantic segmentation. These tasks play a central role in self-driving cars, robotics, automated inspection in manufacturing, assistance in medical diagnosis, etc.

A change in the architecture of CNNs is proposed, where convolution layers are replaced with a sequence of band splitting, parallel convolutions and concatenation. The experiments with a real image dataset from an electronics manufacturing plant show that such a change in a classification CNN with three convolution layers results in higher accuracy, at all epochs. The final accuracy plateaus at 0.97 for the proposed architecture, while it plateaus at 0.94 for the baseline architecture. The number of trainable parameters is almost the same: the proposed architecture has only 3 more parameters, out of more than a million. It is believed that the constraint of processing separately the low frequency content and the high frequency content at each layer prevents the CNN from overlooking some information that may be critical in reaching the last points of accuracy.

Figure 11:
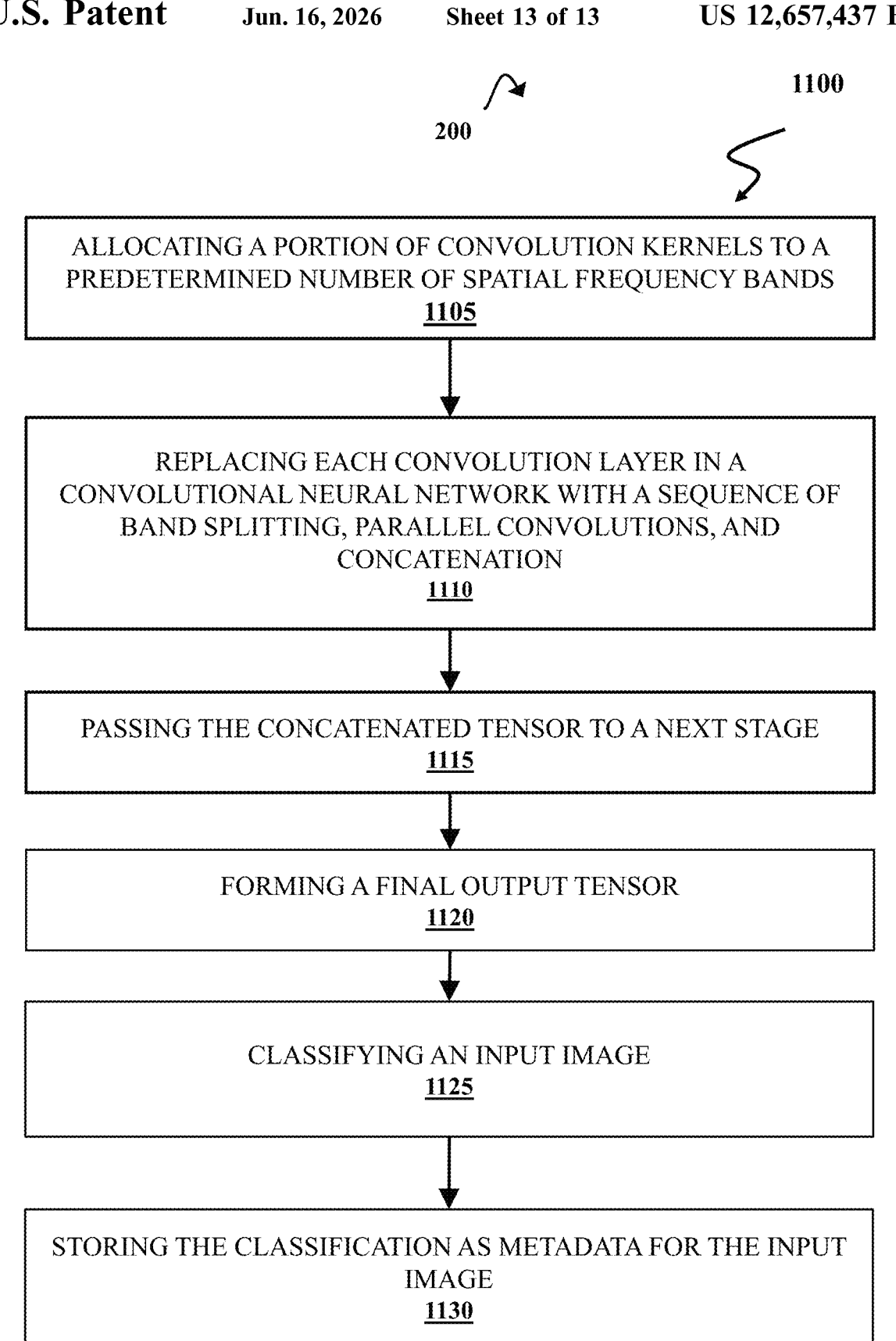
FIG. 11 depicts an example method for spatial frequency splitting for convolutional neural networks according to various embodiments of the present invention.

FIG. 11 depicts an example method 1100 for spatial frequency splitting for convolutional neural networks. Operations of method 1100 may be enacted by one or more computer systems such as the system described in FIG. 1 above. In some embodiments, example method 1100 may be executed by code 199 from FIG. 1.

Method 1100 begins with operation 1105 in response to receiving an input tensor of a predetermined shape, allocating a portion of convolution kernels to a predetermined number of spatial frequency bands. In some embodiments, the system may be directed to use a specific number of bands. In some embodiments, the number of spatial frequency bands may be determined by task specific requirements, image characteristics, computational resources, or empirical experimentation, and/or prior research/domain knowledge.

Task-specific considerations: In some embodiments, particular demands of the application or task may be taken into account. In some instances, different tasks may exhibit varying sensitivities to spatial frequencies. For example, if the objective involves intricate texture analysis, it may be advantageous to utilize a higher number of spatial frequency bands in order to capture a broader range of high-frequency details.

Computational constraints: In some embodiments, the computational limitations or resources available for implementation may affect the number of bands used. The utilization of additional spatial frequency bands augments the computational complexity of the algorithms. In situations where computational resources are limited, a balance should be struck between the number of bands and the computational efficiency of the system.

Empirical experimentation: In some embodiments, the multiple rounds of method 1100 may be performed to determine the optimal number of spatial frequency bands for the specific task. In some instances, the system may assess the performance of algorithms or models utilizing different band configurations and selecting the arrangement that has given the most accuracy in prior rounds of method 1100.

Prior research or domain knowledge: researchers in the field may have established guidelines or recommendations concerning the suitable number of spatial frequency bands for similar applications, which can serve as valuable references.

Method 1100 continues with operation 1110 of replacing each convolution layer in a convolutional neural network with a sequence of band splitting, parallel convolutions, and concatenation. In some instances, the replacing may include splitting the input tensor for each convolution layer into different spatial spectral bands using a trained spatial frequency filter for each stage of the convolutional neural network to exploit frequency features while maintaining information of the input tensor; for each spatial spectral band, allocating parallel convolutions as one of a set of convolution layers to a respective spatial spectral band; in response to generating an output from the parallel convolutions, stacking the output into a single tensor, using concatenation along a channel axis to form a concatenated tensor.

In some instances, splitting the input tensor may start with an initial input tensor. For example, an input tensor may be a multi-dimensional array or data structure containing numerical values. The tensor can have multiple dimensions, such as height, width, and channels in the case of an image. In some embodiments, the system may split the tensor in the spatial frequency domain. Thus, the shape of each split band tensors is the same as the shape of the input tensor (N, C, H, W). See FIGS. 6A and 6B. In some embodiments, the system may specify different spatial frequency bands of the split tensors. The tensors after splitting have the same dimensions as the input tensor. They simply contain information in different spatial frequency bands. For example, each smaller tensor retains the dimensions of the original tensor, except for the split dimension (frequency).

In some embodiments, stacking convolutions into a single tensor involves applying multiple convolutional layers sequentially or in parallel to the split tensors. Each split convolutional layer performs a convolution operation by sliding learnable filters over the input tensor, extracting local spatial patterns. Nonlinear activation functions are applied to introduce nonlinearity, and the output of each layer becomes the input for the next layer. In some embodiments, the outputs of the convolutional layers are then stacked or concatenated (e.g., along a new dimension), creating a single tensor that contains the extracted features from all layers. This stacked tensor captures hierarchical representations and allows for the modeling of complex patterns in the input data.

Method 1100 continues with operation 1115 of passing the concatenated tensor to a next stage, including a pooling layer, and a non-linearity layer.

Method 1100 continues with operation 1120 of in response to completing stages for the predetermined number of spatial frequency bands, forming a final output tensor.

Completing stages for a CNN involves a series of additional operations to process and extract meaningful information from input data. For example, stages may include data preprocessing, activation, convolution, split convolution, flattening, or linear (as described herein).

In some embodiments, formatting a final output tensor may include organizing and structuring the output data of the network into a specific tensor format. The final output tensor represents the network's predictions or results for a given task. The format of the output tensor depends on the nature of the task and the desired output representation.

In some embodiments, the output tensor may be formatted as a probability distribution over different classes. Each element in the tensor corresponds to the predicted probability of the input belonging to a specific class. The tensor is often normalized using a softmax activation function, ensuring that the probabilities sum up to 1.

In some embodiments, the output tensor may contain continuous values representing the predicted numerical outputs. The shape of the tensor depends on the dimensionality of the regression task.

In some embodiments, the output tensor may be structured as a grid or map. Each element in the tensor corresponds to a specific region or pixel in the input, and it contains information about the predicted class, location, or other relevant attributes associated with that region or pixel.

In some instances, the system facilitates the replacement of the convolutional layers with a sequence: [band splitting—parallel convolutions—concatenation]. In some embodiments, the sequence forces the convolution kernels to learn features either in the low or in the high part of the spatial frequency spectrum. In some embodiments, the sequence may be implemented as a drop-in replacement for a convolutional layer. In some embodiments, one, some, or all the convolutional layers are replaced by a sequence (method 1100 depicts all convolutional layers as being replaced). In some embodiments, the band splitting may be implementable as a trainable layer as discussed herein. In some embodiments, the cut-off frequencies are learned from the training dataset. In some embodiments, splitting into two or more bands requires more than one cut-off frequency.

Method 1100 continues with operation 1125 of classifying an image with the CNN. In some embodiments, a suitable classification algorithm may be used to interpret the CNN's output and determine the most likely object class for the input image. This algorithm converts the scores into probabilities, indicating the likelihood of the image belonging to each object class.

Method 1100 continues with operation 1130 of storing the classification result as metadata for the input image. This could involve attaching the predicted class label and corresponding probabilities to the image file or saving them in a separate database or file alongside the image.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
   a memory storing program instructions; and
   a processor in communication with the memory, the processor being configured to execute the program instructions to perform processes comprising:
      allocating, in response to receiving an input tensor of a predetermined shape, a portion of convolution kernels to a predetermined number of spatial frequency bands;
      replacing a convolution layer in a convolutional neural network with a sequence of band splitting, parallel convolutions, and concatenation; and
      forming, in response to completing stages for the predetermined number of spatial frequency bands, a final output tensor.

2. The system of claim 1, wherein the memory stores further program instructions, and wherein the processor is configured to execute the further program instructions to perform the processes further comprising:

splitting the input tensor for the convolution layer into different spatial spectral bands using a trained spatial frequency filter for the stage of the convolutional neural network to exploit frequency features while maintaining information of the input tensor.

3. The system of claim 2, wherein the memory stores further program instructions, and wherein the processor is configured to execute the further program instructions to perform the processes further comprising:

allocating, for the spatial spectral band, parallel convolutions as one of a set of convolution layers to a respective spatial spectral band.

4. The system of claim 3, wherein the memory stores further program instructions, and wherein the processor is configured to execute the further program instructions to perform the processes further comprising:

generating an output from the parallel convolutions.

5. The system of claim 4, wherein the memory stores further program instructions, and wherein the processor is configured to execute the further program instructions to perform the processes further comprising:

stacking the output into a single tensor.

6. The system of claim 5, wherein the memory stores further program instructions, and wherein the processor is configured to execute the further program instructions to perform the processes further comprising:

forming, based on the single tensor using concatenation along a channel axis, a concatenated tensor.

7. The system of claim 6, wherein the memory stores further program instructions, and wherein the processor is configured to execute the further program instructions to perform the processes further comprising:

passing the concatenated tensor to a next stage, including a pooling layer, and a non-linearity layer;

classifying an object in an input image related to the input tensor; and storing the classification as metadata for the input image.

8. A method comprising:

allocating, in response to receiving an input tensor of a predetermined shape, a portion of convolution kernels to a predetermined number of spatial frequency bands;

replacing a convolution layer in a convolutional neural network with a sequence of band splitting, parallel convolutions, and concatenation; and forming, in response to completing stages for the predetermined number of spatial frequency bands, a final output tensor.

9. The method of claim 8, wherein the method further comprises:

splitting the input tensor for the convolution layer into different spatial spectral bands using a trained spatial frequency filter for the stage of the convolutional neural network to exploit frequency features while maintaining information of the input tensor.

10. The method of claim 9, wherein the method further comprises:

allocating, for the spatial spectral band, parallel convolutions as one of a set of convolution layers to a respective spatial spectral band.

11. The method of claim 10, wherein the method further comprises:

generating an output from the parallel convolutions.

12. The method of claim 11, wherein the method further comprises:

stacking the output into a single tensor.

13. The method of claim 12, wherein the method further comprises:

forming, based on the single tensor using concatenation along a channel axis, a concatenated tensor.

14. The method of claim 13, wherein the method further comprises:

passing the concatenated tensor to a next stage, including a pooling layer, and a non-linearity layer;

classifying an object in an input image related to the input tensor; and storing the classification as metadata for the input image.

15. A computer program product comprising a computer readable storage medium having program instructions embodied therewith, the program instructions executable by a processor to cause the processor to perform a method, the method comprising:

allocating, in response to receiving an input tensor of a predetermined shape, a portion of convolution kernels to a predetermined number of spatial frequency bands;

replacing a convolution layer in a convolutional neural network with a sequence of band splitting, parallel convolutions, and concatenation; and forming, in response to completing stages for the predetermined number of spatial frequency bands, a final output tensor.

16. The computer program product of claim 15, further comprising additional program instructions stored on the computer readable storage medium and configured to cause the processor to perform the method further comprising:

splitting the input tensor for the convolution layer into different spatial spectral bands using a trained spatial frequency filter for the stage of the convolutional neural network to exploit frequency features while maintaining information of the input tensor.

17. The computer program product of claim 16, further comprising additional program instructions stored on the computer readable storage medium and configured to cause the processor to perform the method further comprising:

allocating, for the spatial spectral band, parallel convolutions as one of a set of convolution layers to a respective spatial spectral band.

18. The computer program product of claim 17, further comprising additional program instructions stored on the computer readable storage medium and configured to cause the processor to perform the method further comprising:

generating an output from the parallel convolutions.

19. The computer program product of claim 18, further comprising additional program instructions stored on the computer readable storage medium and configured to cause the processor to perform the method further comprising:

stacking the output into a single tensor.

20. The computer program product of claim 19, further comprising additional program instructions stored on the computer readable storage medium and configured to cause the processor to perform the method further comprising:

forming, based on the single tensor using concatenation along a channel axis, a concatenated tensor;

passing the concatenated tensor to a next stage, including a pooling layer, and a non-linearity layer;

classifying an object in an input image related to the input tensor; and storing the classification as metadata for the input image.

* * * * *